United States Patent
Kurosaki et al.

(10) Patent No.: US 6,875,244 B2
(45) Date of Patent: Apr. 5, 2005

(54) METHOD OF PRODUCING ELECTRIC CELLS USING SUBSTANCE INJECTION

(75) Inventors: Masato Kurosaki, Minato-ku (JP); Toshihiko Nishiyama, Minato-ku (JP); Hiroyuki Kamisuki, Minato-ku (JP); Gaku Harada, Minato-ku (JP); Yuji Nakagawa, Minato-ku (JP); Tomoki Nobuta, Minato-ku (JP); Masaya Mitani, Minato-ku (JP)

(73) Assignee: NEC Tokin Corporation, Miyagi (JP)

( * ) Notice: Subject to any disclaimer, the term of this patent is extended or adjusted under 35 U.S.C. 154(b) by 356 days.

(21) Appl. No.: 10/153,631

(22) Filed: May 24, 2002

(65) Prior Publication Data

US 2002/0178575 A1 Dec. 5, 2002

(30) Foreign Application Priority Data

May 30, 2001 (JP) ........................................ 2001-163015

(51) Int. Cl.[7] ........................ H01M 10/34; H01M 10/40
(52) U.S. Cl. ..................... 29/623.2; 29/623.5; 429/162; 429/185
(58) Field of Search ............................. 29/623.2, 623.5; 429/163, 162, 128, 185; 361/504

(56) References Cited

U.S. PATENT DOCUMENTS 4,035,909 A * 7/1977 Dey ........................... 29/623.2
4,548,880 A * 10/1985 Suzuki et al. ................ 429/162
5,942,351 A * 8/1999 Van Lerberghe .............. 429/55
6,356,433 B1 * 3/2002 Shi et al. ..................... 361/502

FOREIGN PATENT DOCUMENTS

| JP | 6-188149 A | 7/1994 |
| JP | 8-78291 A | 3/1996 |
| JP | 10-79328 A | 3/1998 |
| JP | 10-97959 A | 4/1998 |

* cited by examiner

*Primary Examiner*—Carol Chaney
(74) *Attorney, Agent, or Firm*—Sughrue Mion, PLLC

(57) ABSTRACT

The object of the present invention is to provide a method of producing electric cells which can improve the production yield, and for that purpose there is provided a method of producing an electric cell, wherein an acidic solution as an electrolytic solution and electrically conductive rubber as an exterior material are used, characterized in that sealing both of the positive electrode and the negative electrode piled via the separator with both of the gasket, through which the stainless needle is inserted, and the electrically conductive rubber, performing a vulcanization binding, after said vulcanization binding, forming a hole by pulling off the stainless needle from the gasket, injecting the electrolytic solution through said hole and sealing said hole; thus obtaining electric cells at high production yield.

20 Claims, 5 Drawing Sheets

| | Vulcanization Binding defect | Tube Insertion defect | Electrolytic solution Injection amount: off-spec | Sealing defect of Injection hole | ESR: off-spec | Leakage of Electrolytic Solution | Production Yield(%) |
|---|---|---|---|---|---|---|---|
| Example 1 | 4 | 0 | 2 | 0 | 1 | 0 | 93 |
| Example 2 | 0 | 1 | 1 | 0 | 1 | 0 | 97 |
| Example 3 | 0 | 0 | 2 | 0 | 1 | 0 | 97 |
| Example 4 | 1 | 1 | 3 | 1 | 3 | 1 | 90 |
| Comparative Example 1 | 4 | 22 | 15 | 5 | 0 | 10 | 44 |
| Comparative Example 2 | 19 | *** | 24 | *** | 12 | 5 | 40 |
| Comparative Example 3 | 5 | 37 | 10 | 3 | 31 | 4 | 10 |

METHOD OF PRODUCING ELECTRIC CELLS USING SUBSTANCE INJECTION

BACKGROUND OF THE INVENTION

(1) Field of the Invention

The present invention relates to a method of producing an electric cell wherein a positive electrode and a negative electrode are piled via a separator and, particularly, to a method of producing an electric cell wherein an acidic solution is used as an electrolytic solution and electrically conductive rubber as exterior material.

(2) Description of the Prior Art

Conventionally, metallic materials, whose electrical conductivity and barrier property to liquids are excellent, are used usually as exterior materials for electric cells when an electrolytic solution used in the cell is an alkaline solution or an organic solvent. However, when the electrolytic solution is acidic, metallic materials are not used, except for some noble metals, as exterior materials, since the metallic materials are corroded. Therefore, carbonaceous materials or electrically conductive rubber materials, wherein powder of carbon (carbon filler) is dispersed, are used when an acidic solution is utilized as an electrolytic solution. When electrically conductive rubber is used as exterior material, application of adhesives might be used as assembling method (adhesive method) for an exterior, however, vulcanization binding method is superior from a standpoint of ease of assembling.

Therefore, in the process of producing an electric cell wherein electrically conductive rubber is used as exterior material and acidic solution is utilized as an electrolytic solution, there are two methods of providing electrolytic solution in the electric cell, i.e., that of forming the exterior after containing the electrolytic solution in electrodes or a separator and that of injecting the electrolytic solution through a hole which is formed after forming the exterior of the electric cell.

However, in the method of forming the exterior after containing the electrolytic solution in electrodes or a separator, an electrolytic solution leaks to the surface of vulcanized rubber due to the expansion or boiling of the electrolytic solution by heating during the vulcanization binding process of the rubber, resulting in insufficient vulcanization which causes reduction in reliability of the exterior material. Furthermore, there is a problem of limited amount of the electrolytic solution, because the amount of containing electrolytic solution in the electrodes or the separator is only that which can be impregnated previously before assembling.

And when the hole for injecting the electrolytic solution is formed after forming the exterior, there is a problem of breaking the electrodes due to the difference of hardness between the electrodes and the exterior materials and, furthermore, a problem of reduction in accuracy of processing.

When the hole for injecting the electrolytic solution is previously formed by making a hollow, cutting, or drilling a hole in the rubber, deformation and plugging of the hole may occur by the pressure and heating during the vulcanization binding process of the rubber, resulting in the reduction of the product yield. Furthermore, there is experienced a difficulty in the process of injecting the electrolytic solution because of variable shape of the hole.

SUMMARY OF THE INVENTION

The present invention was invented considering the circumstances described above, and the purpose of the invention is to provide a method of producing an electric cell wherein a positive electrode and an negative electrode are piled via a separator and the assembling yield of the electric cell can be improved.

The present invention was invented to solve the problems described above and the invention as claimed in Claim 1 is a method of producing an electric cell comprising:

a process of forming a layer of a positive electrode and a negative electrode piled via a separator inside an annular gasket wherein a rod member is previously provided in such a way as going through the gasket from the inside to the outside;

a process of sealing said positive electrode and said negative electrode by pasting electrically conductive plate members to open spaces of said gasket;

a process of forming a hole in the gasket by pulling off said rod member from said gasket; and a process of injecting an electrolytic solution into the inside of the electric cell through said hole formed in the gasket and sealing the hole.

The invention as claimed in Claim 2 is the method of producing the electric cell as claimed in Claim 1, wherein said rod member is a needle.

The invention as claimed in Claim 3 is the method of producing the electric cell as claimed in Claim 1, wherein said rod member is a tube.

The invention as claimed in Claim 4 is the method of producing an electric cell comprising:

a process of providing previously a rod member in such a way as going through an annular gasket from the inside to the outside, forming a hole by pulling off said rod member from the gasket, and inserting an electrolytic solution injecting tube for injecting an electrolytic solution into said hole;

a process of forming a layer of a positive electrode and a negative electrode piled via a separator inside said gasket;

a process of sealing said positive electrode and said negative electrode by pasting electrically conductive plate members to open spaces of said gasket;

a process of injecting an electrolytic solution through said electrolytic solution injecting tube into the inside of the electric cell;

a process of pulling off said tube from said gasket to form a hole and sealing the hole.

BRIEF DESCRIPTION OF THE DRAWINGS

In FIGS. 1, 2, 5, 6, 7 and 8, 1 means a positive electrode; 2 means a negative electrode; 3 means a separator; 4 means a gasket; 5 means an electrically conductive rubber; 6 means a stainless needle; 7 means a cell after vulcanization binding; 8 means a tube for injecting an electrolytic solution; 9 means an electrolytic solution; 10 means a pressure vessel; 11 means a vacuum pump and 12 means a pressure pump.

DETAILED DESCRIPTION OF PREFERRED EMBODIMENTS

Figure 1:
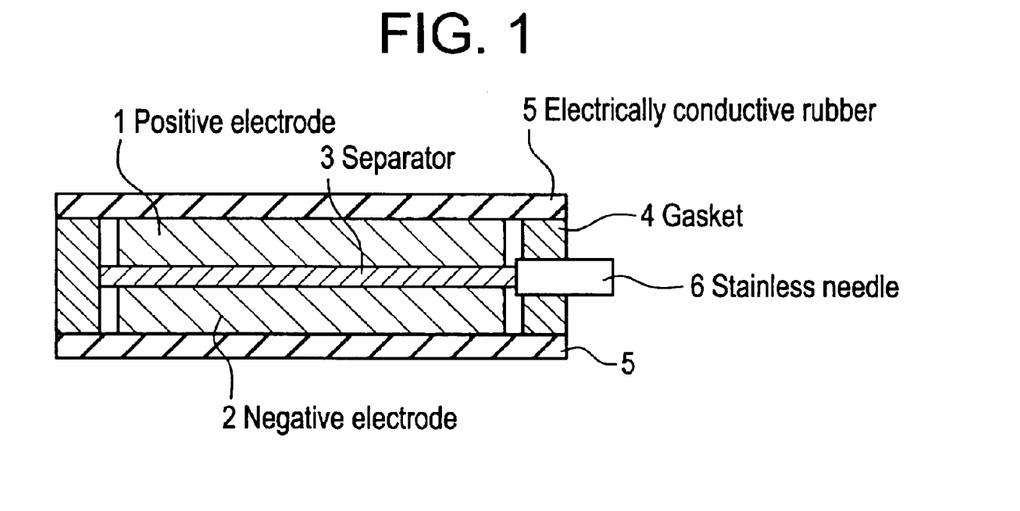
FIG. 1 is a cross-sectional view of the electric cell according to the first, the second, and the third embodiments of the present invention.

A method of producing electric cells by the first embodiment of the present invention is explained with reference to the following drawings:

FIG. 1 is a construction drawing of the electric cell which shows the first embodiment. In this figure, 1 shows a positive electrode, 2 shows a negative electrode, 3 shows a separator separating the positive electrode 1 and the negative electrode 2. 4 shows a gasket, for which butyl rubber cut in required size (thickness:3 mm) of squared frame-like and having an insulating property is used. 5 shows electrically conductive rubber, for which butyl rubber having electrically conductive property is used. 6 shows a stainless needle used to make a hole for injecting an electrolytic solution.

Figure 2:
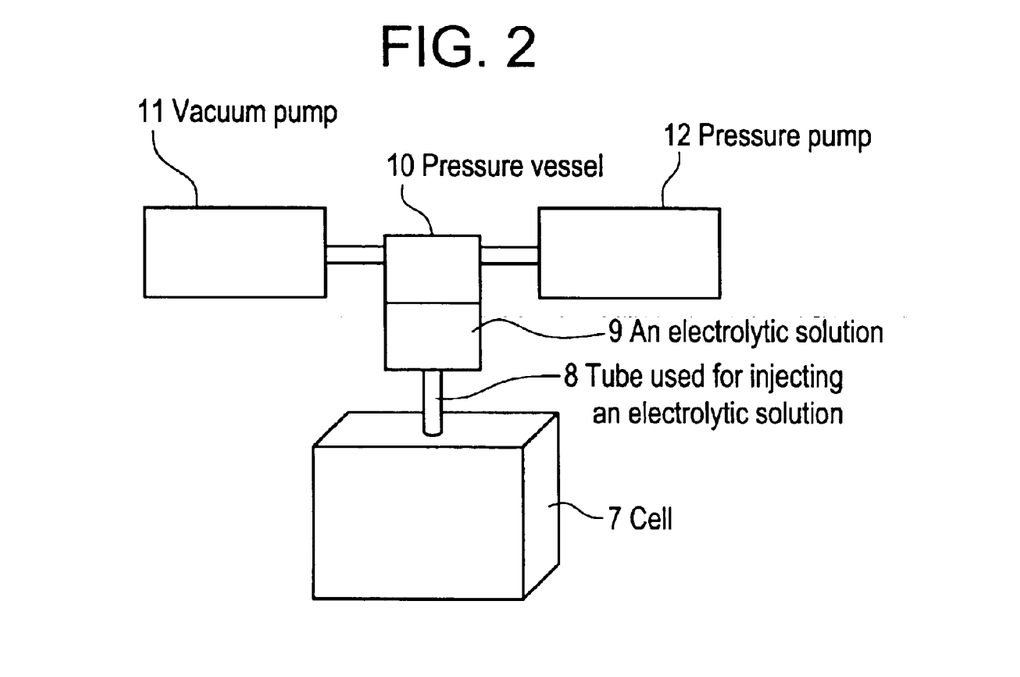
FIG. 2 is a drawing showing the construction of the method for injecting an electrolytic solution according to the first, the second, the third, and the fourth embodiments of the present invention.

FIG. 2 is a drawing showing a structure of an apparatus for injecting an electrolytic solution into the electric cell of the first embodiment. In this figure, 7 shows a minimum unit of the electric cell wherein the positive electrode 1 and the negative electrode 2 are piled via the separator 3 and are sealed by the gasket 4 and the electrically conductive rubber 5 and are bound by vulcanization. 8 shows a tube made of fluororesin which is fitted to the hole formed in the gasket 4 and used for injecting an electrolytic solution. 9 shows an electrolytic solution which is contained in a pressure vessel 10. 11 shows a vacuum pump connected to the pressure vessel 10. 12 shows a pressure pump connected to the pressure vessel 10.

Figure 3:
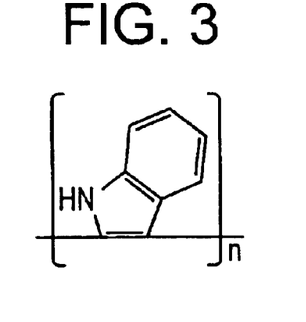
FIG. 3 is a drawing showing the structural formula of polyindole used as the positive electrode material according to the first, the second, the third, and the fourth embodiments of the present invention.

Procedures of producing the electric cell are explained in the following:

Polyindole indicated in FIG. 3, which is an active material of the positive electrode is used as the positive electrode 1. 20 wt % of carbon grown in vapor phase as a conductive auxiliary material and 8 wt % of vinyliden polyfluoride (mean molecular weight:1100) as a molding material of electrode are added to the polyindole. Then, the mixture is stirred by a blender and is molded in a require size by a hot press molding machine.

Figure 4:
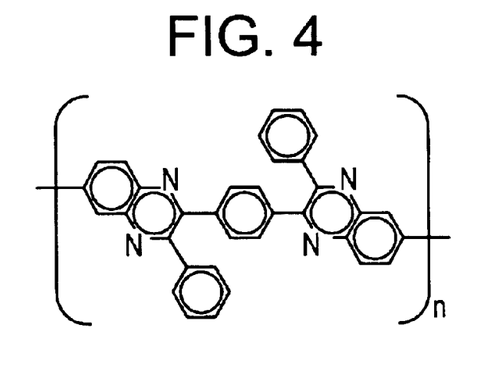
FIG. 4 is a drawing showing the structural formula of polypheylquinoxaline used as the negative electrode material according to the first, the second, the third, and the fourth embodiments of the present invention.

Polyphenylquinoxaline indicated in FIG. 4, which is an active material of the negative electrode is used as the negative electrode 2. 25 wt % of carbon grown in vapor phase as a conductive auxiliary material is added to the polypheylquinoxaline. Then, the mixture is stirred by a blender and is molded in a required size by a hot press molding machine.

Then, a layer is formed wherein the positive electrode 1 and the negative electrode 2 are piled via the separator 3 inside the annular gasket 4 through which a rod member is previously provided in such a way as going from the inside to the outside. The procedure is as follows: firstly, with reference to FIG. 5, two sets of the gasket 4, which are not vulcanized yet, and the stainless needle 6 ($\phi$ 1.0 mm) are used. The needle 6 is provided so that the needle goes through one of the gasket 4. Then, the positive electrode 1 and the negative electrode 2 are piled via the separator 3 inside between the gasket 4, through which the stainless needle 6 has been provided, and the other gasket 4.

Figure 5:
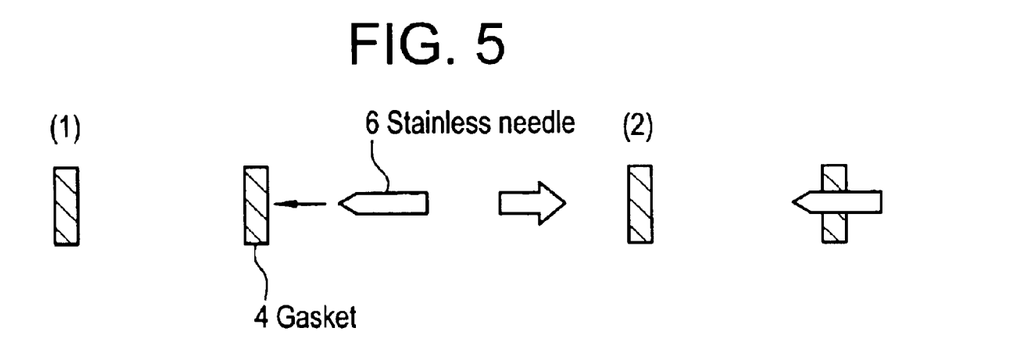
FIG. 5 is a drawing showing the method of forming the hole for injecting an electrolytic solution according to the first, the second, the third, and the fourth embodiments of the present invention.

Then, the positive electrode 1 and the negative electrode 2 are sealed by pasting an electrically conductive plate member to the open spaces of the gasket 4, i.e., both of the positive electrode 1 and the negative electrode 2, which have been piled via the separator 3, are sealed by both the gaskets 4 and the electrically conductive rubber 5, which has not been vulcanized yet, as the electrically conductive plate member. Then, vulcanization binding treatment is performed by heating at 120° C. for three hours to form the cell 7 while applying pressure to both the gaskets 4 and the electrically conductive rubber 5.

Then, the rod member is pulled off from the gasket 4 and a hole is formed in the gasket 4, i.e., the stainless needle 6 is pulled off from the gasket 4 of the cell 7, which has been bound by vulcanization, and a hole is formed in order to inject an electrolytic solution 9 into the cell 7.

Then, an electrolytic solution 9 is injected through the hole, which has been formed in the gasket 4 of the cell 7, and the hole is sealed, i.e., with reference FIG. 2, the tube 8 (outer diameter $\phi$ 1.0 mm) made of fluororesin for injecting an electrolytic solution is inserted into the hole, which has been formed by pulling off the stainless needle 6 from the gasket 4, in order to inject the electrolytic solution 9. And then, the pressure of the cell 7 is reduce using the vacuum pump 11, which is connected through the pressure vessel 10 to the tube 8 for injecting an electrolytic solution. Specifically, the pressure of the cell 7 is reduced to 3999.66 Pa (30 torr) for five minutes.

Then, the pressure of the cell 7 is increased using the pressure pump 12, which is connected through the pressure vessel 10 to the tube 8 for injecting an electrolytic solution. Specifically, the pressure of the cell 7 is increased to 303975 Pa (3 atmospheric pressure) for five minutes using the pressure pump 12. Thus, the electrolytic solution 9 is injected into the cell 7 by this pressurization.

Next, after injecting the electrolytic solution 9 into the cell 7, the tube 8 for injecting the electrolytic solution is pulled off and a sealing pin ($\phi$ 1.2 mm) made of ABS resin is inserted into the hole used for injecting the electrolytic solution 9 and the hole is sealed.

According to the first embodiment of the present invention, a hole for injecting the electrolytic solution 9 having a constant shape can be formed by providing a rod member previously such that the rod member goes through the gasket 4 from the inside to the outside, and the production yield can be increased. Furthermore, the hole for injecting the electrolytic solution 9 can be formed easily by using the stainless needle 6 as the rod member.

Next, a method of producing electric cells by the second embodiment of the present invention is explained with reference to FIG. 1 and FIG. 2. The method of producing electric cells by the second embodiment of the present invention is different from the first embodiment with respect to the following:

In stead of using the stainless needle 6 shown in FIG. 1, a stainless tube (outer diameter $\phi$:1.0 mm, inner diameter $\phi$:0.3 mm) is pierced from a side of the gasket 4. Then, the hole for injecting the electrolytic solution 9 is formed by pulling off the stainless tube after binding the gasket 4 with the electrically conductive rubber 5 by vulcanization.

Then, in FIG. 2, the electrolytic solution 9 is injected into the cell 7, and the hole for injecting the electrolytic solution is sealed according to the same procedure as in the first embodiment of the present invention.

Thus, according to the second embodiment of the present invention, a hole for injecting the electrolytic solution having a constant shape can be formed by providing a tube previously such that the tube goes through the gasket 4 from the inside to the outside, and forming the hole for injecting the electrolytic solution 9. Furthermore, by using the tube to maintain the shape of the hole for injecting the electrolytic solution, it is possible to purge the gas generated in the cell 7 by heating during vulcanization binding and to reduce the number of defect in the vulcanization binding, which results in a further improvement of the production yield.

Next, a method of producing electric cells by the third embodiment of the present invention is explained with reference to Figs. The method of producing electric cells by the third embodiment of the present invention is different from the first embodiment with respect to the following:

Before vulcanization binding, a hole for injecting the electrolytic solution 9 is formed by pulling off the stainless needle 6 from the gasket 4 which has been pierced previously. Next, the tube 8 (outer diameter $\phi$:1.0 mm, inner diameter $\phi$:0.2 mm) for injecting the electrolytic solution is inserted into this hole. Then, the positive electrode 1 and the negative electrode 2 are piled via the separator 3 inside this gasket 4. Next, after binding the gaskets 4 with the electrically conductive rubber 5 by vulcanization, the tube 8 for injecting the electrolytic solution, which has previously been fixed to the cell 7 is connected to the pressure vessel 10. And, in FIG. 2, the electrolytic solution 9 is injected into the cell 7 and the hole used for injecting the electrolytic solution is sealed according to the same procedure as in the first embodiment of the present invention.

Thus, according to the third embodiment of the present invention, by inserting previously the tube 8 for injecting the electrolytic solution in the gasket 4 before the vulcanization binding, a hole for injecting the electrolytic solution having a constant shape can be formed, and it is possible to purge the gas generated in the cell 7 during the vulcanization binding process. Furthermore, a process of inserting the tube 8 for injecting the electrolytic solution after the vulcanization binding can be omitted and, therefore, mechanical stress cannot be generated in the cell 7 after the vulcanization binding, and peeling off of the vulcanization binding surface does not occur.

Figure 6:
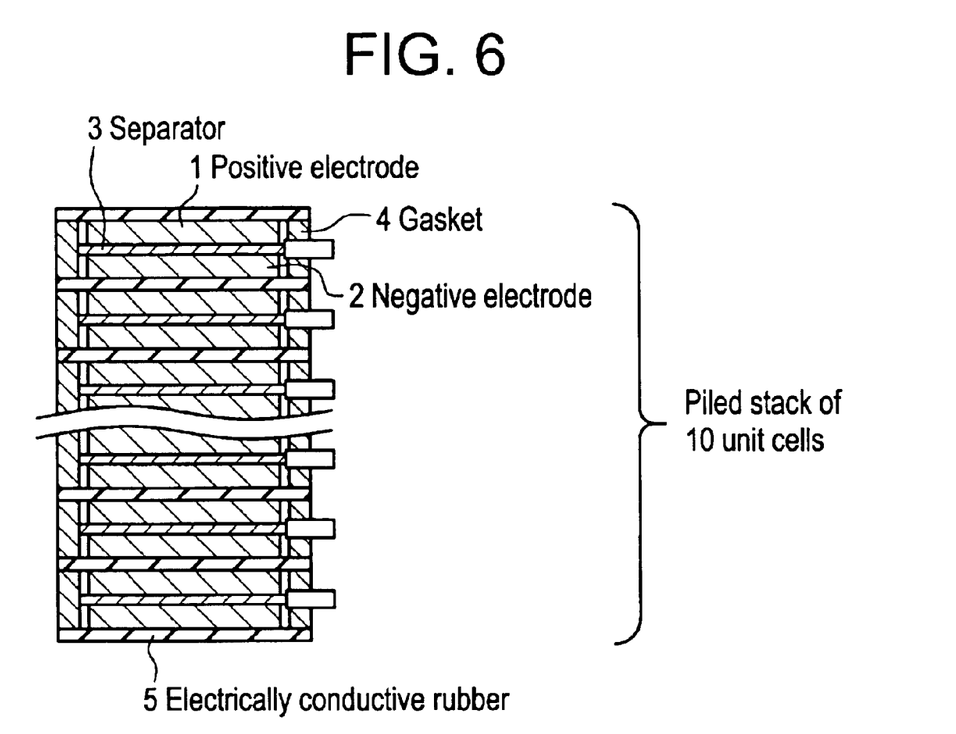
FIG. 6 is a cross-sectional view showing of the electric cell according to the fourth embodiment of the present invention.

Next, a method of producing electric cells by the fourth embodiment of the present invention is explained with reference to Figs. The method of producing electric cells by the fourth embodiment of the present invention is different from the second embodiment with respect to the following:

The package in FIG. 6, wherein 10 pieces of the unit cell are piled longitudinally, is sealed with the gasket 4 and the electrically conductive rubber 5 and is vulcanized for binding. And, in FIG. 2, the electrolytic solution 9 is injected into the cell 7 and the hole used for injecting the electrolytic solution 9 is sealed according to the same procedure as in the second embodiment of the present invention.

Next, in order to explain the effects of the above described embodiments of the present invention, electric cells are produced according to three kinds of method as comparative examples.

Figure 7:
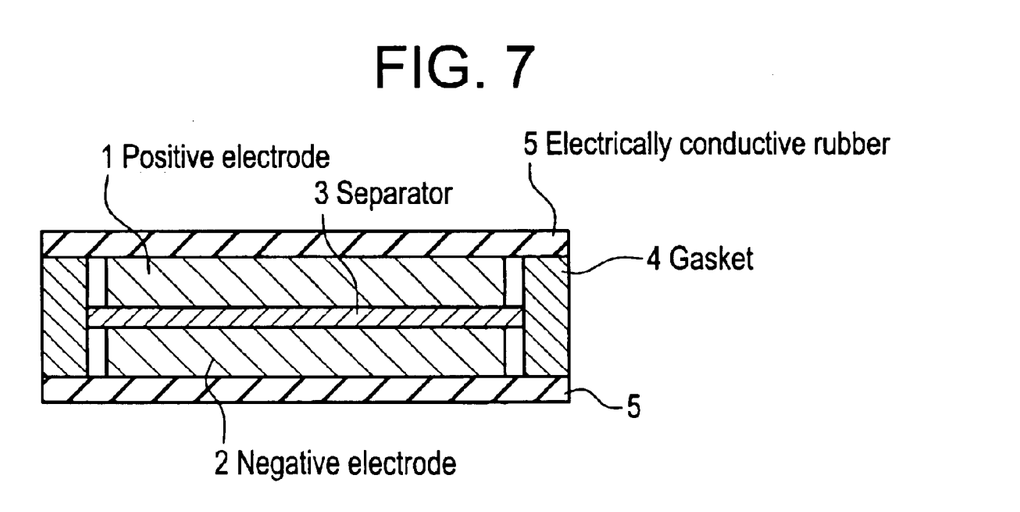
FIG. 7 is a cross-sectional view of the electric cell produced according to the first and the second conventional methods.

With reference to FIG. 7 a method of producing electric cells is explained according to the first Comparative Example. FIG. 7 is a drawing which shows the structure of the electric cell according to the first Comparative Example.

Firstly, the positive electrode 1 and the negative electrode 2 are molded using the same materials and same procedures as in the first to fourth embodiments of the present invention. Next, the positive electrode 1 and the negative electrode 2 are piled via the separator 3 and sealed with the gasket 4 made of insulating butyl rubber and the electrically conductive rubber 5 made of electrically conductive butyl rubber, both of which have not been vulcanized yet, and then, the sealed package is processed for vulcanization binding by heating at 120° C. for three hours while applying pressure.

Next, a hole for injecting the electrolytic solution 9 is opened in said vulcanization bound gasket 4 using a drill ($\phi$ 1.0) and according to FIG. 2 the tube 8 (outer diameter $\phi$ 1.0 mm) is inserted into the hole for injecting said electrolytic solution 9. Then, the pressure in the cell 7 is reduced to 3999.66 Pa (30 torr) for five minutes using the vacuum pump 11 and then, the pressure in the cell 7 is increased to 3 atmospheric pressure for five minutes using the pressure pump 12 and the electrolytic solution 9 is injected into the cell 7.

Next, after injecting the electrolytic solution 9 into the cell 7, the tube 8 used for injecting the electrolytic solution is pulled off and a sealing pin ($\phi$ 1.2 mm) made of ABS resin is inserted into the hole used for injecting the electrolytic solution 9 and the hole is sealed.

Next, a method of producing electric cells according to the second Comparative Example is explained with reference to FIG. 7. Firstly, the positive electrode 1 and the negative electrode 2 are molded using the same materials and same procedures as in the first to fourth embodiments of the present invention. Then, the electrolytic solution is impregnated into the positive electrode 1 and the negative electrode 2, respectively, under vacuum and the impregnated positive electrode 1 and the impregnated negative electrode 2 are piled via the separator 3 which has also been impregnated with the electrolytic solution. After the piling, the piled package is sealed using the gasket 4 and the electrically conductive rubber 5, both of which have not been vulcanized yet, and after the sealing, the sealed package is processed for vulcanization binding by heating at 120° C. for three hours while applying pressure.

Figure 8:
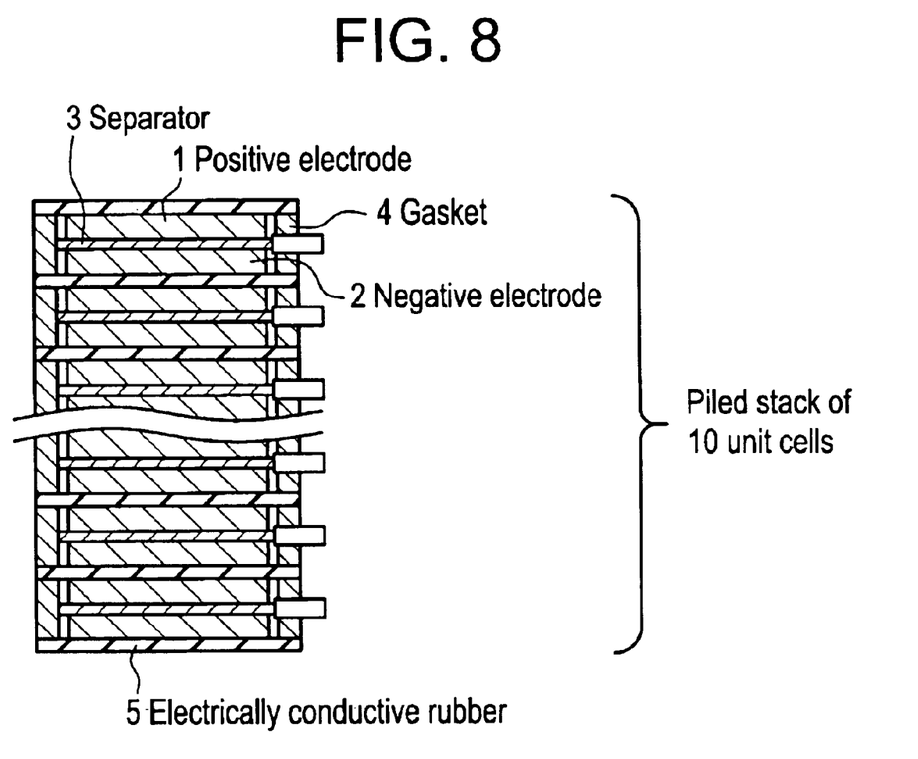
FIG. 8 is a cross-sectional view of the electric cell produced according to the third conventional method.

Next, a method of producing electric cells according to the third Comparative Example is explained with reference to FIG. 8. A structural drawing of the electric cell according to the third Comparative Example is shown in FIG. 8. In the third Comparative Example, a package of 10 unit cells piled longitudinally in FIG. 8 is sealed using the gasket 4 and the electrically conductive rubber 5 and processed for vulcanization binding using the method of producing the electric cells according to the first Comparative Example. And a hole for injecting the electrolytic solution 9 is formed according to the same procedure as in the first Comparative Example and the electrolytic solution 9 is injected through the hole and then, the hole is sealed.

According to the methods of producing electric cells described in the first to fourth embodiments of the present invention and in the first to third Comparative Examples, 100 units of each electric cell are produced, respectively.

Next, applying the pressure of 980665 Pa (10 kgf/cm$^2$) to the metal plates which are fitted to the sides (parts of the electrically conductive rubber) of each of the above produced electric cells, ESR (Equivalent Series Resistance) of each cell is measured using 1 kHz AC.

Figure 9:
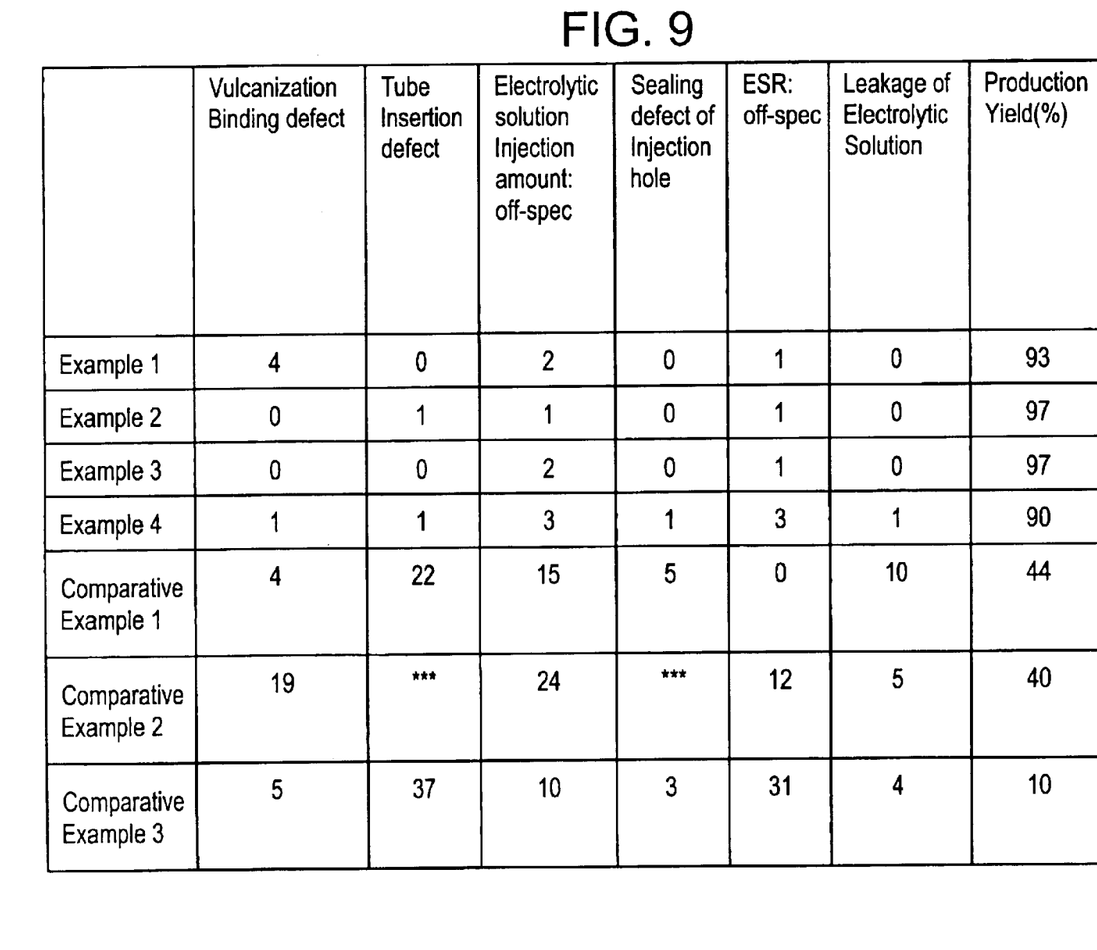
FIG. 9 is a drawing indicating the list of the production yields of the cells produced according to the methods of the embodiments of the present invention and the conventional methods.

Next, FIG. 9 shows a table indicating the production yields and the positions and types of the defect of the electric cells produced according to the methods described above, respectively. The values shown in the lines of Example 1 to Example 4 in FIG. 9 indicate the numbers of the units having defect and the production yield in the 100 units of the electric cells produced according to the first to fourth embodiments of the present invention. Further, the values shown in the lines of Comparative Examples 1 to 3 in FIG. 9 indicate the numbers of the units having defect and the production yield in the 100 units of the electric cells produced according to the modes of embodiments of the Comparative Examples 1 to 3.

The following is the explanation of the effects of the embodiments of the present invention obtained as a result of studying the positions, types and causes of the defect with respect to FIG. 9:

Firstly, referring to the item of the defect of vulcanization binding in FIG. 9 and comparing the values in the item of the Examples 1 to 4 with that of the Comparative Example 2, it is found that the value of the defect of vulcanization binding in the Example 1 is reduced. This reduction in the value of the defect is attributed to the fact that before the process of the vulcanization binding of the gasket 4 with the electrically conductive rubber 5, the electrolytic solution 9 does not exist inside the cell 7, i.e., inside both the gasket 4 and the electrically conductive rubber 5 which are to be bound by vulcanization. Thus, the expansion of the electrolytic solution 9 does not occur by the heating during the process of the vulcanization binding and furthermore, there do not occur the spouting out of the electrolytic solution 9 and the leakage of the electrolytic solution 9 to the boundary surface of the vulcanization binding. Therefore, according to the Example 1, it is possible to perform the vulcanization binding without fail.

Comparing the items in the Example 1 with those in the Examples 2 to 4, in the Example 1, the value of the defect of vulcanization binding is slightly higher. The cause of this defect is due to the fact that, in the Example 1, the cell 7 is sealed by the use of the stainless needle 6 to maintain the shape of the hole for injecting the electrolytic solution, and the vulcanization binding on the boundary surface of vulcanization binding is not completed sufficiently by the expansion of the gas generated in the cell 7 by the heating during the process of the vulcanization binding. On the other hand, according to the Examples 2 to 4, it is possible to purge the gas generated by the heating during the process of vulcanization binding to the atmosphere by the use of a tube in place of the stainless needle 6, which results in a further improvement of the production yield.

Next, with reference to the item of the tube insertion defect in FIG. 9, comparing the values of the Examples 1 to 4 with that of the Comparative Example 1, it is found that the values of the tube insertion defect are reduced in the embodiments of the present invention. The cause of this reduction in the values is due to the fact that the hole formed for injecting the electrolytic solution 9 in the Comparative Example 1 becomes incomplete. While, according to the Example 1 to 4, the holes pierced completely can be formed because the holes are previously opened by providing beforehand a rod member through the gasket 4.

Next, with reference to the item of the off-specification amount of electrolytic solution injection in FIG. 9, comparing the values of the Examples 1 to 4 with that of the Comparative Example 1, it is found that the values of the off-specification amount of electrolytic solution injection are reduced in the Examples 1 to 4. The cause of this reduction in the values is due to the fact that, according to the Examples 1 to 4, although fine cracks or gaps are generated through the gaskets 4 during the process of forming holes through the gaskets, these cracks and gaps are repaired during the vulcanization process. Therefore, the contact is complete between the gasket 4 and the tube 8 for injecting the electrolytic solution 9, and the leakage of the air are restricted. Further, comparing the Comparative Example 2 with the Examples 1 to 4, there is no loss in the amount of the electrolytic solution during the process of the vulcanization binding in the Examples 1 to 4, since the electrolytic solution 9 is injected after the process of the vulcanization binding.

Next, with reference to the item of the sealing defect of the injection hole in FIG. 9, comparing the values of the Examples 1 to 4 with that of the Comparative Example 1, it is found that the values of the sealing defect of the injection hole are reduced in the Examples 1 to 4. The cause of this reduction in the values is due to the fact that, according to the Examples 1 to 4, although fine cracks or gaps are generated through the gaskets 4 during the process of forming holes through the gaskets, these cracks and gaps are repaired during the vulcanization process, and therefore, the contact is improved between the gasket 4 and the sealing pin.

Next, with reference to the item of the off-specification of ESR in FIG. 9, comparing the values of the Examples 1 to 4 with that of the Comparative Example 1, it is found that the values of the off-specification of ESR is reduced in the Examples 1 to 4. The cause of this reduction in the values is due to the fact that, according to the Examples 1 to 4, the contact is improved between the gasket 4 and the tube 8 for injecting the electrolytic solution 9, and therefore, the vacuum before injecting the electrolytic solution 9 is complete and gas (the air) does not remain in the electrodes. Further, comparing the Comparative Example 2 with the Examples 1 to 4, in the Examples 1 to 4, abnormal ESR due to the insufficiency of the amount of the electrolytic solution can be avoided, because the electrolytic solution 9 is injected after the process of the vulcanization binding.

Next, with reference to the item of the electrolytic solution leakage after leaving as it is in FIG. 9, comparing the values of the Examples 1 to 4 with that of the Comparative Example 1, it is found that the values of the electrolytic solution leakage are reduced in the Examples 1 to 4. The cause of this reduction in the values is due to the fact that, according to the Examples 1 to 4, the process of drilling the holes into the gasket 4 is omitted after the process of the vulcanization binding, and therefore, mechanical stress cannot be generated in the exterior of the electric cell and peeling off of the vulcanization binding surface and cracks in the rubber film of electricity collector do not occur. Further, comparing the Comparative Example 2 with the Examples 1 to 4, in the Examples 1 to 4, the vulcanization binding is complete since there is no electrolytic solution 9 inside the electric cells during the process of the vulcanization binding.

Comparing the Example 4, wherein 10 units of the cell are piled longitudinally, with the Comparative Example 3, in the Example 4, the same effects as described above are obtained, which results in the improvement of the production yield.

Thus, according to the first to fourth embodiments of the present invention, it is possible to improve the production yield drastically by the process of providing previously a rod member in such a way as going through an annular gasket from the inside to the outside, forming a hole for injecting an electrolytic solution by pulling off the rod member from the gasket after the process of vulcanization binding.

Furthermore, although in the first to fourth embodiments of the present invention polyindole and polyphenylquinoxaline are used as active materials, the active materials are not limited to these two materials. As other alternative materials used for this purpose, there are, for example, organic or inorganic materials having the property of redox reaction and active carbon materials having the capacity of storing electricity when contacting with an electrolytic solution.

Although an aqueous solution of sulfuric acid is used as an electrolytic solution, there is no limitation to the electrolytic solution if they give the function of storing electric charge when reacting with the electrode active materials and, in addition, corrode metals. Furthermore, although butyl rubber for a gasket and electrically conductive butyl rubber for an electricity collector are used, other rubber materials or carbon materials and electrically conductive polymers may be utilized if they resist against electrolytic solutions and can be bound by vulcanization or adhesives without having permeability to electrolytic solutions.

As described above, according to the present invention, the first effect of the improvement in the production yield of the electric cells is obtained by providing the stainless needle 6 through the gasket 4 to form the hole for injecting the electrolytic solution 9.

The second effect of the further improvement than the first effect in the production yield of the electric cells is obtained due to the fact that the gas generated in the cell can be purged through a tube by utilizing the tube in place of said stainless needle 6 during the process of the vulcanization binding of the exterior.

In addition to the first and the second effects described above, the third effect of the further speeding up of the production processes is obtained due to the fact that, by utilizing a tube for injecting electrolytic solution in place of said tube, the process of inserting the tube for injecting the electrolytic solution after the process of the vulcanization binding can be omitted.

What is claimed is:

1. A method of producing an electric cell comprising:
   a process of forming a layer of a positive electrode and a negative electrode piled via a separator inside an annular gasket wherein a rod member is previously provided in such a way as going through the gasket from the inside to the outside;
   a process of sealing said positive electrode and said negative electrode by pasting electrically conductive plate members to open spaces of said gasket;
   a process of forming a hole in the gasket by pulling off said rod member from said gasket; and
   a process of injecting an electrolytic solution into the inside of the electric cell through said hole formed in the gasket and sealing the hole.

2. The method of producing the electric cell as claimed in claim 1, wherein said rod member is a needle.

3. The method of producing the electric cell as claimed in claim 1, wherein the said member is a tube.

4. A method of producing an electric cell comprising:
   a process of providing previously a rod member in such a way as going through an annular gasket from the inside to the outside, forming a hole by pulling off said rod member from the gasket, and inserting an electrolytic solution injecting tube for injecting an electrolytic solution into said hole;
   a process of forming a layer of a positive electrode and a negative electrode piled via a separator inside said gasket;
   a process of sealing said positive electrode and said negative electrode by pasting electrically conductive plate members to open spaces of said gasket;
   a process of injecting an electrolytic solution through said electrolytic solution injecting tube into the inside of the electric cell;
   a process of pulling off said tube from said gasket to form a hole and sealing the hole.

5. A method of producing an electric cell, comprising:
   providing a rod member through a gasket;
   forming a layer of a positive electrode and a negative electrode piled via a separator inside said gasket;
   sealing said positive electrode and said negative electrode;
   forming a hole in said gasket by removing said rod member from said gasket;
   injecting a solution through said hole formed in said gasket; and
   sealing said hole.

6. The method of claim 5, wherein said providing comprises inserting said rod member through said gasket from inside to outside.

7. The method of claim 5, wherein said sealing said positive electrode and said negative electrode comprises pasting electrically conductive plate members to open spaces of said gasket.

8. The method of claim 5, further comprising performing a vulcanization binding treatment prior to forming said hole.

9. The method of claim 8, wherein said rod member comprises a tube.

10. The method of claim 9, wherein gas generated in said performing said vulcanization binding treatment is purged through said tube.

11. The method of claim 9, wherein said tube maintains the shape of said hole.

12. The method of claim 5, wherein said solution comprises an electrolytic solution.

13. The method of claim 5, wherein said sealing said hole comprises inserting a sealing pin into said hole.

14. The method of claim 5, wherein said rod member comprises a tube.

15. The method of claim 14, wherein said tube maintains the shape of said hole.

16. A method of producing an electric cell, comprising:
   providing a rod member through a gasket;
   forming a hole in said gasket by removing said rod member from said gasket;
   inserting a tube into said hole;
   forming a layer of a positive electrode and a negative electrode piled via a separator inside said gasket;
   performing a vulcanization binding treatment;
   injecting a solution through said tube; and
   sealing said hole.

17. The method of claim 16, further comprising sealing said positive electrode and said negative electrode by pasting electrically conductive plate members to open spaces of said gasket.

18. The method of claim 16, wherein said providing comprises inserting said rod member through said gasket from the inside to the outside.

19. The method of claim 16, wherein said solution comprises an electrolytic solution.

20. The method of claim 16, wherein said gasket and said tube are in complete contact.

* * * * *